Oct. 28, 1947.  R. E. THOMPSON  2,429,702
DUAL CONTROL POWER UNIT
Filed June 8, 1943  2 Sheets-Sheet 1
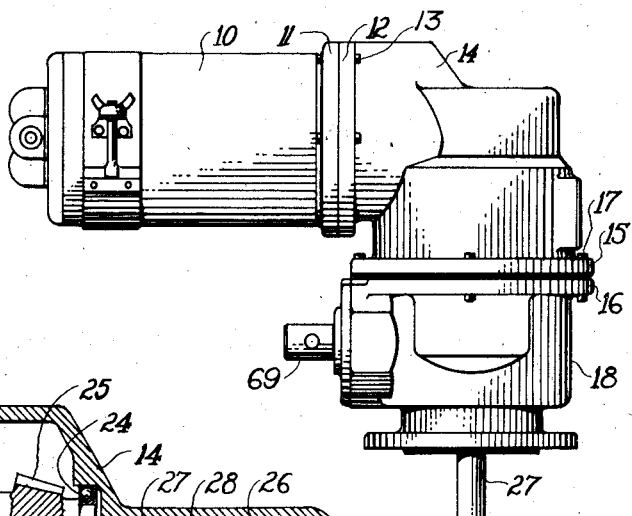
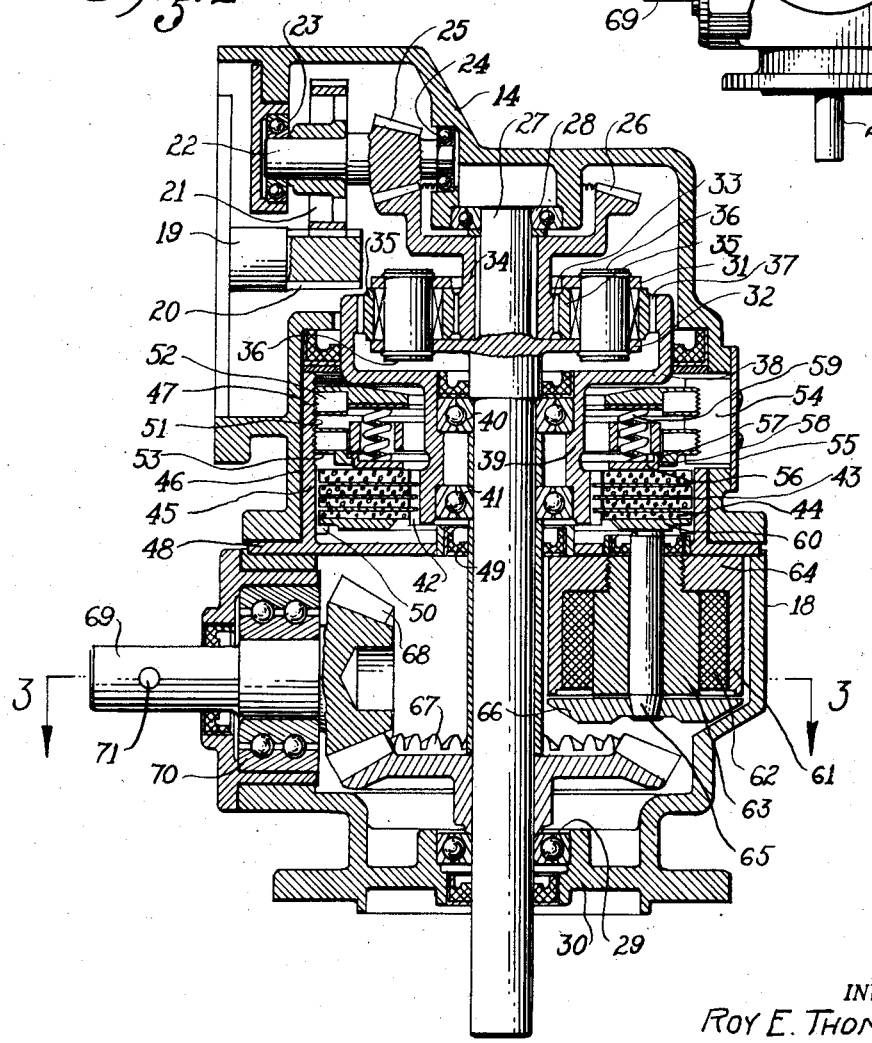
INVENTOR.
ROY E. THOMPSON.
BY
James M. Abbott
ATTY.

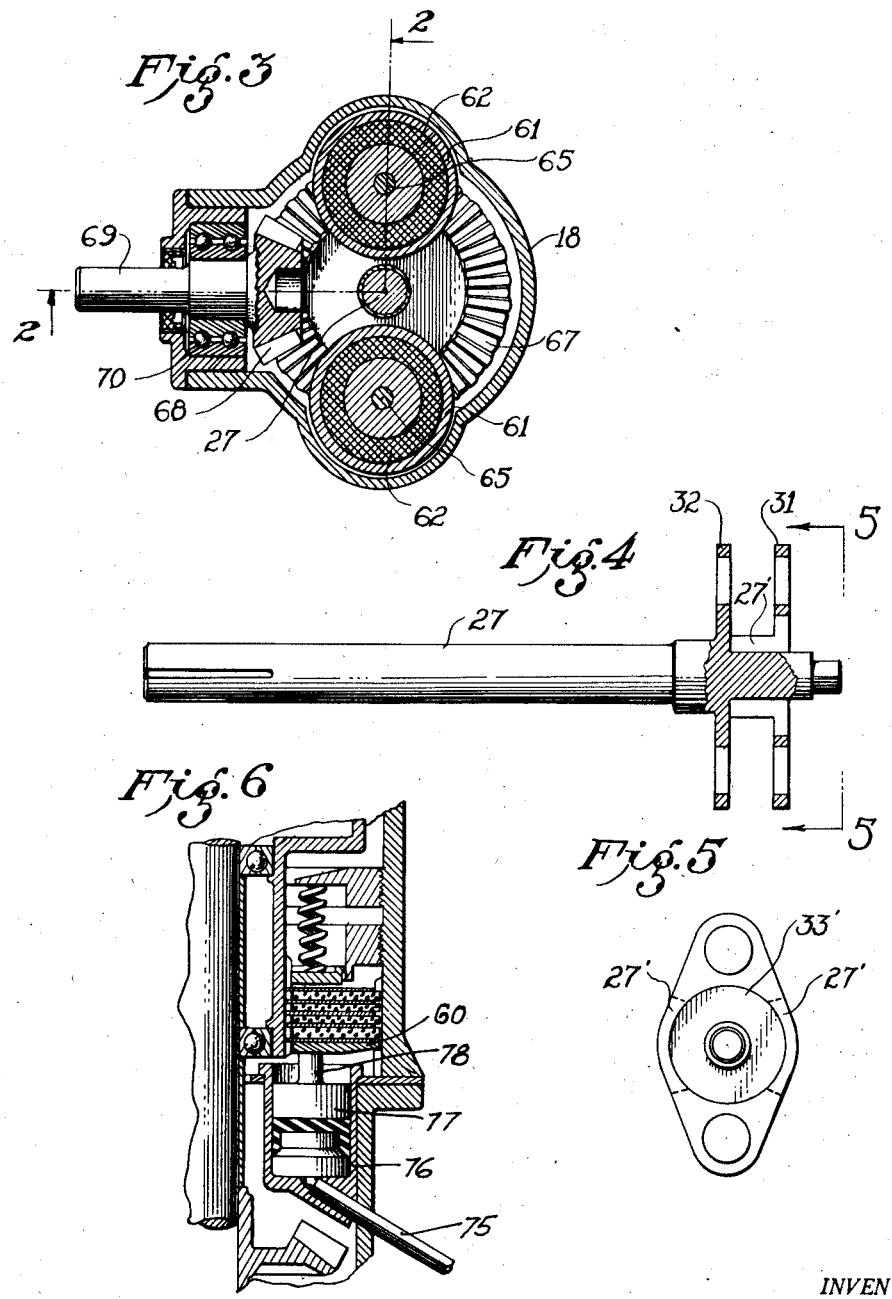

Patented Oct. 28, 1947

2,429,702

UNITED STATES PATENT OFFICE 2,429,702

DUAL CONTROL POWER UNIT

Roy E. Thompson, South Gate, Calif.

Application June 8, 1943, Serial No. 490,089

5 Claims. (Cl. 74—291)

This invention relates to the transmission of power, and particularly pertains to a dual control power unit.

In the operation of various types of mechanism adapted to be remotely controlled, such for example as the bomb doors on an airplane, it is desirable to provide a structure which includes a power unit disposed adjacent to the mechanism to be actuated, and a power transmission interposed between the power unit and the operated mechanism, whereby power may be delivered through a high ratio train of gears, and within which an overload brake and locking means are incorporated in a relatively small space. It is the principal object of the present invention, therefore, to provide a unitary power and transmission structure, within which is incorporated a high reduction train of gears adapted to transmit power from a prime mover to a driven shaft, said train of gears being so selected and designed as to fit within a relatively small case, and in connection with which an overload brake and a releasing brake are incorporated, while accommodating a manual drive for the driven gear to be actuated in the event the prime mover becomes inoperative.

The present invention contemplates the provision of a housing from which a prime mover, such as an electric motor, may be supported, and within which housing a driven shaft is rotatably disposed, the prime mover being indirectly connected with the driven shaft through a train of gears and an overload brake, the housing also accommodating a train of gears adapted to be manually operated to drive the driven shaft.

The invention is illustrated by way of example in the accompanying drawings, in which:

Figure 1 is a view in side elevation showing the structure of the present invention.

Fig. 2 is a view in vertical section through the driving unit with the motor omitted, as seen on line 2—2 of Fig. 3.

Fig. 3 is a view in transverse section as seen on the line 3—3 of Fig. 2 and shows the arrangement of the manually operated gear train and the solenoid brake coils.

Fig. 4 is a view in side elevation of the main shaft and the unitary gear supports thereon.

Fig. 5 is a view in end elevation showing the structure of Fig. 4.

Fig. 6 is a fragmentary view showing an adaptation of the present invention to utilize an incompressible fluid to operate the brake when an hydraulic prime mover is used.

Referring more particularly to the drawings, 10 indicates a prime mover, here shown as an electric motor. This motor is fitted at one end with a bolting flange 11 which abuts against a bolting flange 12 and is secured in place by bolts 13. The bolting flange 12 forms a part of an angle housing 14 which is fitted with a bolting flange 15 at right angles to the bolting flange 12. A complementary bolting flange 16 abuts against the bolting flange 15 and is secured in position by bolts 17. The bolting flange 16 is formed at one end of a cylindrical housing 18, which is disposed with its longitudinal axis at right angles to the longitudinal axis of the motor 10.

The motor 10 is fitted with a shaft 19, which is shown in Fig. 2 of the drawings as having a spur gear pinion 20 at its end. The pinion is in mesh with a spur gear 21 carried upon a counter-shaft 22 disposed parallel to the axis of the motor shaft 19 and here disclosed as being mounted thereabove. One end of the counter-shaft 22 is supported within a bearing 23 carried by the angle housing 14. The opposite end of the shaft 22 is supported in a bearing 24 within the housing 14. Formed upon the shaft 22 adjacent to the bearing 24 is a bevel pinion 25. This pinion is in mesh with a bevel gear 26 which is free to rotate upon the upper end of driven shaft 27. The driven shaft 27 extends through the cylindrical housing portion 18 and is concentric therewith. The upper end of the driven shaft is rotatably supported by a bearing 28. The lower end of the shaft 27 is rotatably supported in a bearing 29, which is carried by a transverse end web 30 of the cylindrical housing 18. Formed integral with the driven shaft 27 is a plurality of pairs of radial arms 31 and 32, which are spaced from each other and are positioned adjacent to the upper end of the shaft. Centrally of these arms is a space to receive a spur gear 33, which is formed integral with a hub 34 of the bevel gear 26. This spur gear circumscribes the upper end of the shaft 27 and is in mesh with a plurality of planetary spur gears 35, which are positioned between pairs of the radial arms 31 and 32 and are mounted to rotate upon shafts 36 carried by these arms.

The planetary gears 35 are in mesh with a circumscribing ring gear 37. The ring gear 37 is formed with a web 38 and a hub 39. The hub 39 circumscribes the driven shaft 27 and is rotatably mounted thereon by bearings 40 and 41. The hub 39 of the ring gear 37 extends a desired distance along the shaft 27 and adjacent to its end is formed with a plurality of keys 42 to receive a friction brake disc 43. These discs are free to slide longitudinally of the keys and have complementary brake discs 44 disposed between them. The brake discs 44 are mounted within a brake housing 45 which is disposed within a bore 46 of the angle housing 14. This housing has a cylindrical portion 47 extending longitudinally of the bore 46 within which it fits and a transverse end plate 48 having a flange interposed between the bolting flanges 15 and 16 by which it is held in place removably. The transverse end plate 48 has a central bore through which the driven shaft 27 extends, and which bore is fitted with a packing gland 49. The cylindrical portion 47 of the brake housing 45 is formed on its inner face with keys 50 in the area circumscribing the brake discs 43 and 44. Thus, the discs 44 are keyed to the housing 45 and held against rotation. The opposite end of the cylindrical wall 47 of the brake housing 45 is internally threaded, as indicated at 51, to receive an outer adjustable brake ring 52 and an inner stop ring 53. These rings are formed with radial holes accessible through an opening 54 so that the rings may be separately adjusted longitudinally of the wall 47 for a purpose to be hereinafter described. A cover plate 55 is provided for the opening 54. Resting against the uppermost brake disc 44 is a pressure ring 56 formed with an annular lip 57 which may engage a stop lip 58 on the stop ring 53. Interposed between the pressure ring 56 and the outer brake ring 52 is a plurality of brake springs 59, which yieldably force the pressure ring 56 against the group of brake plates 43 and 44. These springs may be tensioned by adjustment of the outer brake ring 52. An annular pressure plate 60 is in register with a set of brake rings and is disposed upon the opposite side of the brake rings 43 and 44 from the pressure ring 56.

The pressure plate 60 is adapted to be forced against the group of rings by the action of solenoid coils 61. As shown in Fig. 3 of the drawings, two of these coils are provided. It is to be understood, however, that the number of coils might be varied. In a co-pending application entitled "Power driven gear unit" and filed by John K. Morris and Roy E. Thompson on May 31, 1943, and bearing Serial No. 489,240, a brake structure is disclosed similar to the brake here described. In the present instance, however, it is necessary to embody manually operable means for rotating the driven shaft 27 under emergency conditions, and in order to accommodate the additional mechanism a plurality of solenoid coils 61 are used as here shown. These coils are positioned concentrically around the axis of shaft 27 and include a suitable winding 62 around a tubular core 63. The core 63 has a threaded extension passing through an outer case 64. This case is secured to the end plate 48 of the brake housing 45. Extending concentrically of each of the cores 63 is a plunger 65 which projects upwardly through an opening in the end plate 48 and bears against the brake pressure plate 60. Mounted upon the opposite end of each of the plungers 65 is an armature plate 66 which is influenced by the magnetic field of a solenoid coil 61 and causes the plungers 65 to exert pressure upon the brake discs in opposition to the pressure exerted by the brake springs 59. It is to be understood that the solenoid coils 61 and the motor 10 are electrically connected so that when the motor circuit is closed the solenoids will be energized to make the brakes effective, and when the motor circuit is open the solenoids will be de-energized, so that the brake discs 43 and 44 will not be in effective frictional engagement.

The auxiliary drive for the driven shaft 27 comprises a bevel gear 67 which is fixed upon the shaft 27 and is in mesh with bevel pinion 68. The bevel pinion 68 is fixed at the end of a manually operable shaft 69. The shaft 69 is mounted in suitable bearings 70 carried in the cylindrical housing 18 and through which the shaft 69 projects. A suitable pin 71 extends transversely through the shaft 69 to provide positive engagement for an operating crank (not shown in the drawings).

Referring particularly to Figs. 4 and 5 of the drawings, it will be seen that the driven shaft 27 is formed as a unit with the radial arms 31 and 32 between which the planetary spur gears 35 are positioned. The radial arms are formed with central openings to receive the shafts 36 upon which the spur gears are mounted. At points between the arms 31 and 32 webs 27' occur. These webs tie the arms together, and are arcuate in shape, so that a space will occur around the driven shaft 27 to accommodate the gear 33. The structure including the driven shaft 27, the arms 31 and 32, and the webs 27' are formed in one drop forging operation, and thus provide a unitary structure which is decidedly strong, and which insures rapid assembly of the planetary gear set on the driven shaft. Attention is directed to the fact that the arms 31 and 32 extend entirely around the shaft and are tied together at opposite sides thereof by the webs 27', and that furthermore an opening 33' extends entirely through the set of arms 31 to accommodate the spur gear 33, which is mounted upon the portion of shaft 27 occurring between the arms 31 and 32, and which gear is disposed between the web portions 27'.

In operation of the present invention the motor 10 and the solenoid coils 61 are connected with a suitable source of electricity to be controlled by a common control switch. When the circuit is closed the motor begins to rotate the shaft 19 and the spur pinion 29. This pinion in turn drives the gear wheel 21 which is keyed onto the shaft 22. The bevel pinion 25 rotates in unison with the gear 21 and imparts rotation to the bevel gear 26. This moves the pinion 33 in unison therewith and acts to rotate the planetary gears 35 which are carried upon the driven shaft 27. Concurrent with the initial rotation of the motor the solenoid coils 61 will be energized to force the plungers 65 against the brake plates 60. This force will act to move the brake discs 43 and 44 into frictional engagement and will tend to hold the hub 39 of gear 37 against rotation. The frictional contact between the brake plates 43 and 44 has been determined previously by adjustment of the outer brake ring 52. The ring 53 serves to limit the movement of the springs 59 and the pressure plate 56 toward the brake plates, thus permitting the brake plates to release when the solenoids are de-energized. It will be evident that when the ring gear 37 is free to rotate without restraint from the brake structure, the gears 35 will rotate the gear 37 without any effective driving action. When, however, the brake is set the gear 37 will be held against rotation and driving action of the gear 33 upon the gears 35 will cause them to travel along the relatively fixed gear 37, so that the gear cage comprising the arms 31 and 32 will move around the axis of driven shaft 27 and will rotate the driven shaft in the same general direction.

When the driving action of the motor is interrupted the drive shaft 19 will be relatively stationary, and it will be necessary to impart rotation to the driven shaft 27 by manual operation. This is accomplished by applying a crank or other driving means to the shaft 69 to impart rotation to the bevel gear pinion 68, and thence to the gear wheel 67 which is keyed onto the shaft 27.

It will thus be seen that the structure here disclosed provides a power transmission unit by which a very high gear ratio may be obtained within a relatively small housing, and which structure includes a positive release brake and an adjustable overload brake, the device further providing means whereby the driven shaft may be actuated by a prime mover or by manual operation, without the necessity for any adjustment of the parts or any release manipulations.

It is to be understood that while Fig. 1 of the drawing shows the prime mover as being an electric motor 10, it may be desirable to use an hydraulically actuated prime mover, such for example as a motor which receives its motive force from an incompressible fluid delivered thereto. It will be understood that a valve is provided to establish or interrupt the flow of fluid to the motor to serve the same function as a switch on an electric motor. Connected to the fluid supply line to the motor at a point between the valve and the motor is a tube 75, which leads to a cylinder 76 incorporated with the housing of the gear unit and taking the place occupied by a solenoid in the structure previously described. This cylinder is fitted with a reciprocating plunger 77 at the end of which is formed a projecting rod or shaft 78 which bears against the face of the brake plate 69. A suitable packing cup 79 is disposed within the cylinder 76 and acts to form a fluid seal for the liquid delivered through the pipe 75. In this form of structure the opening of a control valve to establish delivery of motive fluid to the driving motor will also establish delivery of this fluid through the pipe 75 to the cylinder 76 so that simultaneously pressure will be applied to the brake plate 69 in the same manner as it would be supplied through a solenoid. When the supply of motive fluid is interrupted the brake elements will be free to disengage.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In a device of the character described, a housing, a driven shaft rotatably mounted therein, a power drive shaft rotatably mounted therein, a gear structure including a driving gear, planetary gears in mesh therewith carried by the driven shaft, and a ring gear circumscribing and meshing with said planetary gears interposed between the power drive shaft and the driven shaft, a normally disengaged brake interposed between the ring gear structure and the housing, a manual drive shaft in driving relation to the driven shaft, a bevel gear on the manual drive shaft, a bevel gear fixed on the driven shaft and in constant mesh with the gear on the manual drive shaft, a plurality of magnetic units mounted within the housing and disposed in substantially the same transverse plane of the gear on the manual drive shaft and grouped around the driven shaft in relation to the brake to set the same when energized, an electric motor for rotating the drive shaft, and an electric circuit including the motor and the magnetic means whereby when the circuit is closed the motor will operate and the magnetic means will be energized to set the brake and when the circuit is opened the operation of the motor will be interrupted and the magnetic means will be deenergized.

2. In a device of the character described, a housing, a driven shaft extending longitudinally of said housing, a drive shaft disposed adjacent one end of the driven shaft within the housing, a gear structure including a driving gear, planetary gears in mesh therewith carried by the driven shaft, and a ring gear circumscribing and meshing with said planetary gears for delivering power from the drive shaft to the driven shaft, a normally disengaged brake interposed between the ring gear structure and the housing whereby actuation of said brake will establish a driving connection between the drive shaft and the driven shaft, a housing compartment between the aforementioned assembled structure and the output end of the housing, a manually operated drive shaft rotatably supported through the side wall of said housing, a bevel pinion thereon occupying a part of said housing compartment, a bevel gear fixed upon the driven shaft and in mesh with said pinion, and a plurality of magnetic units mounted within said housing compartment and grouped around the axis of the driven shaft in substantially the same plane as said bevel pinion, and in position to actuate the aforementioned brake.

3. In a device of the character described, a housing, at one end of which a power drive shaft is mounted, a gear train within said housing and responsive to the driving action of said power shaft, a driven shaft rotatably mounted within said housing and extending longitudinally therethrough, a brake structure within the housing and adapted when set to transmit driving force from the gear train to the driven shaft, said gear train and brake structure being disposed at the power input end of the housing, an annular housing compartment occurring at the power output end of the housing and through the center of which said driven shaft extends, a plurality of brake actuating magnets disposed within said compartment and circumferentially spaced around the axis thereof, a bevel pinion within said compartment and occupying a position between said magnets and in substantially the same transverse plane thereof, a drive shaft extending through the wall of said housing and upon which said pinion is mounted, and a bevel gear mounted upon the driven shaft and occupying a space within said compartment adjacent the output end of the housing.

4. A dual control power unit, comprising a housing having power input and power output ends, a driven shaft rotatably supported in the housing and extending longitudinally from the power input to the power output ends thereof, a power input shaft at the power input end of the housing, a reduction gear train and brake structure within the power input end of the housing whereby power may be transmitted to the driven shaft from the power input shaft when the brake is set, a pair of brake setting units disposed at diametrically opposite sides of the longitudinal axis of the driven shaft within the power output end of the housing and acting to set the aforementioned brake, a bevel pinion disposed between said brake setting units and within said power output end of the housing, a manually operated power input shaft extending through the wall of the housing and upon which said bevel pinion is mounted, and a bevel gear mounted within the power output end of the housing upon the driven shaft and in mesh with the bevel pinion.

5. A dual control power unit, comprising a housing having power input and power output ends, a driven shaft rotatably supported in the housing and extending longitudinally from the power input to the power output ends thereof, a power input shaft at the power input end of the housing, a reduction gear train and brake structure within the power input end of the housing whereby power may be transmitted to the driven shaft from the power input shaft when the brake is set, a pair of magnetic brake setting units disposed at diametrically opposite sides of the longitudinal axis of the driven shaft within the power output end of the housing and acting to set the aforementioned brake, a bevel pinion disposed between said magnetic brake setting units and within said power output end of the housing, a manually operated power input shaft extending through the wall of the housing and upon which said bevel pinion is mounted, a bevel gear mounted within the power output end of the housing upon the driven shaft and in mesh with the bevel pinion, a driving motor operatively connected with the power input shaft, and an electric circuit including said motor and the magnetic brake setting means whereby when said circuit is closed the motor and the magnetic brake setting means will be simultaneously energized to set the brake and thus transmit the motive force to the driven shaft, and when the motor circuit is opened the operation of the motor will be interrupted and the magnetic brake setting means will be de-energized.

ROY E. THOMPSON.

REFERENCES CITED

The following references are of record in the file of this patent:

UNITED STATES PATENTS

| Number | Name | Date |
| --- | --- | --- |
| 2,086,030 | Hodgson et al. | July 6, 1937 |
| 2,271,640 | Heintz | Feb. 3, 1942 |
| 1,975,984 | Stoll | Oct. 9, 1934 |
| 1,670,313 | Oswald | May 22, 1928 |
| 1,702,479 | Mosch | Feb. 19, 1929 |
| 1,708,941 | Dean | Apr. 16, 1929 |
| 2,246,673 | Glasner | June 24, 1941 |
| 1,824,826 | Marcus | Feb. 19, 1914 |
| 2,241,087 | Griswold | May 6, 1941 |
| 2,303,637 | Heintz | Dec. 1, 1942 |
| 2,339,473 | Griswold | Jan. 18, 1944 |
| 1,906,733 | Bendix | May 2, 1933 |
| 1,631,470 | Chase | June 2, 1927 |

FOREIGN PATENTS

| Number | Country | Date |
| --- | --- | --- |
| 190,605 | Great Britain | Dec. 28, 1922 |
| 4,294 | Great Britain | Feb. 19, 1941 |